Oct. 22, 1940.   A. H. TOWNSEND ET AL   2,219,203
AUTOMOBILE SIGNAL
Filed June 11, 1933
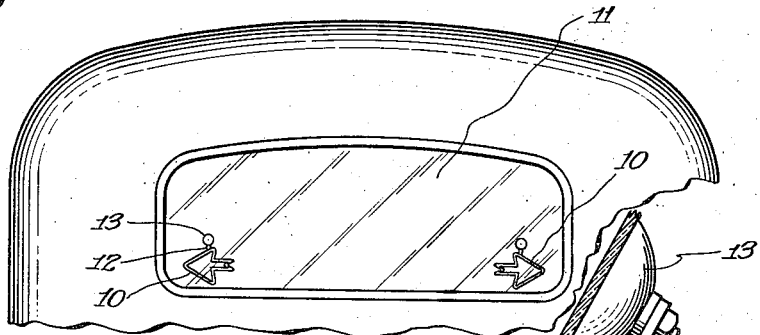
Fig. 1
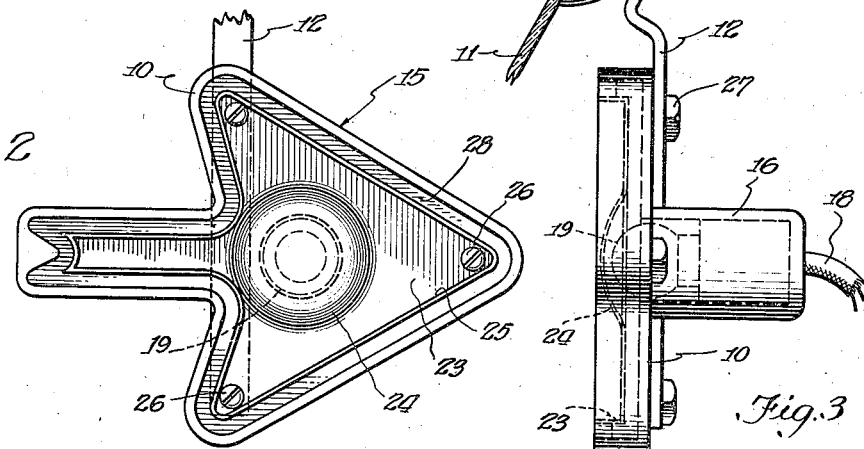
Fig. 2   Fig. 3
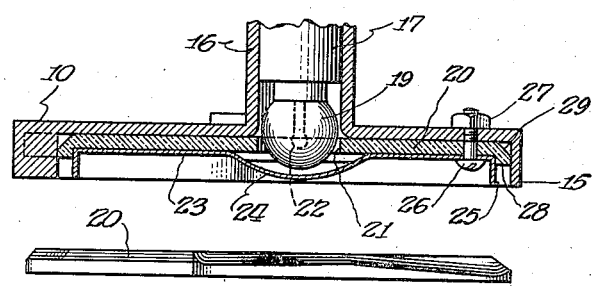
Fig. 4
Fig. 5
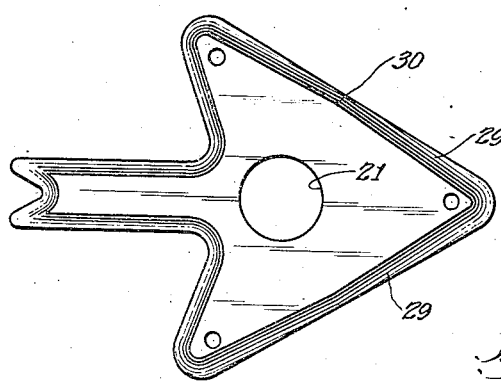
Fig. 6
Inventors:-
Adrian H. Townsend
William C. Augenstein
By: Stevens & Batchelor
Atty's.

Patented Oct. 22, 1940

2,219,203

UNITED STATES PATENT OFFICE 2,219,203

AUTOMOBILE SIGNAL

Adrian H. Townsend and William C. Augenstein, Chicago, Ill.

Application June 11, 1938, Serial No. 213,257

9 Claims. (Cl. 177—329)

Our invention relates to automobile signals, and more particularly to the units which are placed at the front or rear to denote a turn about to be made in the left-hand or right-hand direction, and our main object is to provide a direction indicating unit which casts an illuminated and sharply defined signal legend into view.

A further object of the invention is to provide a unit of the type mentioned which confines a luminous element to a linear form, whose course or outline may be that of an arrow, index hand or other indicating legend.

A still further object of the invention is to include shading means for the luminous element of the indicating unit, that its light may be concentrated and undisturbed by external light.

Another object of the invention is to devise an indicating unit which contains a translucent element for the passage of light from the source of illumination, such element being disposed for casting reflected light in the desired direction with a high degree of efficiency.

An important object of the invention is to construct the indicating unit in a manner to be compact and to confine the light to the immediate course of passage for indicating purposes, so that a small lamp bulb will suffice for casting a sufficient amount of light for the signal.

With the above objects in view, and any others which may suggest themselves from the description to follow, a better understanding of the invention may be had by reference to the accompanying drawing, in which—

Fig. 1 is a rear view of a portion of an automobile body, showing a pair of the direction indicating units installed;

Fig. 2 is an enlarged face view of the right-hand indicating unit;

Fig. 3 is an edge view of the unit in Fig. 2 from the right-hand side and showing means for attaching the unit to the rear window of the automobile;

Fig. 4 is a horizontal section of the unit shown in Fig. 2;

Fig. 5 is a top edge view, partly in section, of a light transmitting lens; and

Fig. 6 is a face view of the said lens.

Automobile signals of the type under consideration usually employ a pair of direction indicating units at the rear, and sometimes another pair at the front, the indicators being placed along the inner sides of the rear and front windows of the automobile. A switch located for handy access by the driver is actuated to operate the indicators in accordance with the direction of the turn intended to be made.

In the present instance, only the rear set of indicating units has been shown, these being denoted by the reference numeral 10. The units may be supported upon opposite sides of the inner surface of the window 11 by any suitable means, one such means being a bracket 12 carrying a vacuum cup 13. The bracket shown is in a form to apply the cup 13 to a tilted window of the modern type, but the bracket may be straight where the window is of the vertical type. The unit 10 is sufficiently light to obtain a good support from a single vacuum cup.

Each unit 10 is, according to the present illustration, in the form of an arrow, although it may be made in the form of an index hand or other signal legend. It is preferably in the form of an open casing having a deep marginal rim 15. The body 10 of the unit is extended rearwardly with a receptacle 16 for a standard type of lamp socket 17, the current supply cord for the socket leading from the rear of the receptacle as indicated at 18 in Fig. 3. A lamp bulb 19 of the 6-8 volt type is insertible into the socket from the front to assume the position indicated in Fig. 4.

For the purpose of the present invention the light from the lamp bulb 19 is transmitted by way of a light transmitting element 20, the latter being of translucent material, such as glass, Lucite or other suitable transparent substance, and preferably is of amber color, since amber light is visible over a longer distance than red or green light.

The light transmitting element 20 is flat and of a thickness approaching ⅛ inch, the proper thickness to be determined by the size of the indicating unit or other requirements; and the size and form of the light transmitting element are similar to that of the casing, in order that the light transmitting element may fit therein as shown in Figs. 2 and 4.

The light transmitting element 20 has a medial opening or cut out portion 21 to clear the lamp bulb 19; and the position of the light transmitting element in respect to the latter is such that the plane of the light transmitting element intersects the zone of the lamp filament 22. On the outside the light transmitting element receives an opaque shield 23 which has a medial bulge 24 to clear the lamp bulb 19. The shield has a rim 25 inwardly spaced from and following the contour of the casing rim 15 providing a marginal channel therearound. The shield receives bolts 26 inside the corners, such bolts passing through the light transmitting element and casing to receive securing nuts 27. As indicated in Fig. 2, two of the bolts also receive the bracket 12 in back of the casing before the nuts 27 are applied, this arrangement eliminating special fastening means for the bracket.

The light transmitting element 20 could be made plain or of even thickness, but it is preferable to have it recessed in its frontal face to present a short rim 28. The light transmitting element thus forms a seat for the shield 23 and secures a more accurate and compact fit between the shield light transmitting element and casing when the bolts are made fast.

In placing the light transmitting element 20 in line with the filament 22 of the lamp bulb, the light from the filament passes directly and in its strongest state through the light transmitting element to the outer portions thereof. Such portions are thus visible through the opening of the channel formed by the rims 25 and 15. However, we have found that by beveling the edges of the light transmitting element from the rear as indicated at 29, the light is reflected rather than diffused, shining brightly from the aforesaid channel. In this respect, the extra thickness imparted to the light transmitting element in the region of its rim enables the bevels 29 to be cut without causing a sharp outer edge which might become damaged or come out imperfectly from the mold in which the light transmitting element is cast or pressed. Thus, a small size of automobile bulb will suffice to pass so much light by way of the reflecting bevels 29 that the image of the arrow or other legend seen in the indicating unit will be bright and clear cut; also, the rims 25 and 15 will serve to shade such image from being disturbed or diffused by light entering from the outside.

It is natural that the light from the lamp bulb 19 should more brightly illuminate the medial portions of the bevels 29, since these are nearest to the source of illumination. For this reason we have chosen to decrease each bevel from the ends toward the center, as indicated at 30, so that the light will be spread evenly and the signal will not show brighter spots at points in its course. Fig. 6 shows the forward sections of the arrow formed as just described, while the rear and stem sections thereof are uniform. The tapers of the bevels may however extend to the rear and stem portions as well, in case experiment proves that these portions, although forming only secondary parts of the signal, should cast light uniformly.

It will be evident from the above description that we have provided an indicating unit which is extremely compact, while containing important values. First, the casing 15 is relatively thin, so that it takes up little space inside the window to which the unit is applied. Second, the casing and the shield are assembled in a manner to compactly confine the light transmitting element 20 between them and allow the light to pass only to the zone of reflection, so that no light is wasted and the economical minimum voltage light bulb may be used with high efficiency. Further, the rims 25 and 15 have the parallel contour of the signal to clearly define the same and perform the shading purpose previously explained. Further, the bevels of the light transmitting element and their tapered formations operate to transmit a maximum of light of uniform intensity. Further, the assembly of the unit is compact and strong, so as to resist shocks and displacing tendencies, being however easily capable of separation by removal of the bolts when a burnt out or defective light bulb is to be replaced. Finally, the novel indicator unit is of a nature to be used at any point where a direction signal is required and with any suitable type of switch, as well as with a flasher where an intermittent signal effect is desired.

While we have described the invention along specific lines, various minor changes or refinements may be made therein without departing from its principle, and I desire to consider all such changes and refinements as coming within the scope and spirit of the appended claims.

We claim:

1. A signal device having a hollow opaque casing having a narrow opening in the face thereof, including portions converging toward each other to form a signal index, a source of light within the casing remote from the opening and out of alinement therewith, a body of light-conducting material having an inner edge opposed to the source of light and having a laterally extending flange at its outer edge registering with said opening, and a reflecting surface at the outer edge of the body and on the side thereof opposite to that on which the flange is located, arranged to reflect the light through the flange and opening.

2. A signal device having a hollow opaque casing having a narrow opening in the face thereof, including portions converging toward each other to form a signal index, a source of light within the casing remote from the opening and out of alinement therewith, a body of light-conducting material having an inner edge opposed to the source of light and having a laterally extending flange at its outer edge registering with said opening, and a reflecting surface at the outer edge of the body and on the side thereof opposite to that on which the flange is located, arranged to reflect the light through the flange and opening, said device also including means for substantially equalizing the intensity of the light transmitted through every part of the opening, irrespective of the distance thereof from said light source.

3. A signal device, comprising a hollow opaque casing having a narrow opening in the face thereof, said opening defining the outline of a signal index, a source of light within the casing remote from said opening and out of alignment therewith, a body of translucent material within said casing and having an inner edge opposed to said source of light, an outer edge portion of said body closing said opening, reflecting means at the outer edge of said body on the surface thereof remote from said opening and arranged to reflect the light through said opening.

4. The structure of claim 3, said reflecting means being formed for substantially equalling the intensity of the light transmitted through every part of said opening, irrespective of the distance thereof from said light source.

5. An automobile signal light, comprising a base, means mounting a light source centrally of the front of said base, a shield overlying the medial portions of the front of said base to restrict the projection of light from said source in a forward direction, said shield being shaped to define a signal index, a body of translucent material interposed between said shield and base and having an inner edge opposed to said light source, a substantially continuous portion of said translucent body extending outwardly of the periphery of said shield to define the outline of a signal index, and reflecting means associated with said portion of said body which extends outwardly of said shield to reflect light forwardly through said portion.

6. An automobile signal light, comprising a casing having a rear wall, an open front and forwardly directed side walls defining a signal index, and electric light bulb having a filament, means mounting said bulb centrally of said rear wall, a body of light transmitting material carried within said casing and conforming substantially in outline to the size and shape of the index defined by said side walls, a shield for said bulb on the outside of said body said shield having a forwardly directed marginal rim extending in spaced parallelism to said side walls, a cut out portion of said body adapted to receive said light bulb with the filament thereof positioned to project light radially outwardly through the opposed edges of said cut out portion and through said body to the space between said rim of said shield and said side walls of said casing, and reflecting means for projecting said light forwardly through said space.

7. The structure of claim 6, the rear outer edges of said body being beveled in the zone of the space between said rim of said shield and said side walls to provide said means for projecting the light forwardly.

8. The structure of claim 6, said casing and body being each substantially flat, said cut out portion extending entirely through said body and said shield being flat for the most part but having an outwardly bulged portion overlying said cut out portion of said body.

9. The structure of claim 6, the rear outer edges of said body being beveled in the zone of the space between said rim of said shield and said side walls to provide said means for projecting the light forwardly, and the angle of the bevel of each edge decreasing toward the region of most intense light from said bulb.

ADRIAN H. TOWNSEND.
WILLIAM C. AUGENSTEIN.